United States Patent [19]

Zimzik

[11] Patent Number: 4,643,837

[45] Date of Patent: Feb. 17, 1987

[54] UTILIZATION OF WOOL GREASE AS WELL AS DRILLING, GRINDING, OR CUTTING EMULSIONS

[76] Inventor: Henry Zimzik, Kirchstrasse 7, 5419 Marienhausen, Fed. Rep. of Germany

[21] Appl. No.: 649,351

[22] Filed: Sep. 10, 1984

[30] Foreign Application Priority Data

Sep. 9, 1983 [DE] Fed. Rep. of Germany ....... 3332584

[51] Int. Cl.$^4$ ................................................ C09K 7/00
[52] U.S. Cl. ................................ 252/8.511; 252/49.3; 252/49.5; 252/9; 252/321
[58] Field of Search ............ 252/8.55 R, 8.5 C, 8.5 A, 252/8.5 M, 309, 314, 344, 351, 41, 40, 56 R, 8.5 P, 49.3, 49.5, 9, 10, 11

[56] References Cited

U.S. PATENT DOCUMENTS

| | | | |
|---|---|---|---|
| 4,002,562 | 1/1977 | Ames et al. | 252/344 |
| 4,066,789 | 1/1978 | Mores et al. | 252/56 R |
| 4,115,314 | 9/1978 | Oppenläender et al. | 252/309 |
| 4,145,307 | 3/1979 | Krapf et al. | 252/309 |
| 4,206,059 | 1/1980 | Burton et al. | 252/41 |
| 4,427,564 | 1/1984 | Brownawell et al. | 252/8.55 R |
| 4,534,799 | 8/1985 | Aguirre | 252/40 |

*Primary Examiner*—Richard D. Lovering
*Assistant Examiner*—T. J. Wallen
*Attorney, Agent, or Firm*—Owen, Wickersham & Erickson

[57] ABSTRACT

Wool grease is utilized as a defoaming agent for aqueous emulsions, more specifically for drilling, cutting, and grinding emulsions that are not injurious to the skin.

8 Claims, No Drawings

UTILIZATION OF WOOL GREASE AS WELL AS DRILLING, GRINDING, OR CUTTING EMULSIONS

The invention concerns the utilization of wool grease and a drilling, grinding, or cutting emulsion.

Aqueous emulsions are employed for a wide variety of purposes, especially in cosmetics but also in foodstuffs and in engineering fields.

In most applications for these kinds of emulsions, foaming in the emulsions is not desired. Emulsion foaming is particularly disadvantageous when the emulsions are being used as lubricants or coolants. Foaming reduces the local concentration of the emulsion, and as a reult, the desired cooling or lubricating function is not achieved.

Until now defoaming agents used were usually silicone derivatives which have considerable disadvantages. Silicone compounds are both poisonous and expensive as well.

Therefore, the purpose of the present invention is to produce an effective defoaming agent especially designed for lubricating and cooling emulsions that is not poisonous and that does not cause allergic reactions in the operating personnel.

The technical problem is solved in accordance with the invention by using wool grease or wool grease products as defoaming agents for aqueous solutions.

A drilling, cutting, or grinding emulsion in accordance with the invention is characterized by the fact that the lubricant is an aqueous drilling, grinding, or cutting aid such as a water-soluble oil.

Using wool grease in amounts ranging from 1 to 10% by weight in an emulsion of this type ensures defoaming while wool grease as the defoaming agent is completely safe with regard to physiological considerations of the operating personnel.

Cooling emulsions that are not injurious to the skin work very satisfactorily in as much as the dreaded "water-soluble oil scratching" that used to affect personnel to the point of being incapacitated for work was no longer a factor. However, the disadvantage was that the known cooling emulsion foamed up, and consequently, its function as a lubricant was not yet optimized. The use of known defoaming agents for this process had the satisfactory defoaming results of course, but the disadvantage was that the silicon compounds normally used for this purpose were not compatible physiologically. In addition, there was a disadvantage in the fact that the working parts being handled could not be given protective coatings.

In accordance with the invention, a physiologically compatible and cost-effective anti-foaming agent is produced that for the first time is not injurious to skin and that operates with the same or improved technical results as other anti-foaming agents used widely at present.

Further advantages and features of the invention are found in the following description wherein the invention is explained by means of examples.

EXAMPLE I

Production of a Cutting, Drilling, or Grinding Emulsion Concentrate 10 parts by weight of a vegetable wax, obtained from plants of the genus Copernicia, are brought to a boil while stirring in 82 parts by weight of a mixture consisting of 50% by weight of $H_2O$, 12.5% by weight of triethanolamine, and 37.5% by weight of diethanolamine as well as 0.1 part by weight of coconut fatty acids/diethanolamide as an emulsifier. After the wax dissolves at the boiling point temperature of the mixture, the wax is cooled down to its transition point at about 90° C. while stirring continues. Then 2% by weight of a conventional trade preservative is mixed in. To the resulting emulsion is added 1% by weight of a wool grease anhydride emulsion produced from wool grease anhydride and up to an equivalent amount by weight of an emulsifier, whereby the ratio surfactant:oil phase is 1:1. Emulsifiers are preferred whose HLB values make dispersion within the micelle range expectable. This emulsion may be diluted by a factor of 35 with water for use a grinding, drilling, or cutting emulsion, whereby a pH value between 8 and 10 is registered.

EXAMPLE II 15 parts by weight of a wax are brought to a boil with 80 parts by weight of a mixture consisting of 50% by weight of $H_2O$, 12.5% by weight of triethanolamine, 37.5% by weight of diethanolamine, and 0.1% by weight of a conventional trade non-ionic emulsifier. This mixture is cooled to 50° C. after complete amination. Subsequently, a conventional trade preservative amounting to 1% of the entire mixture as well as an emulsion of 10% wool fat anhydride plus emulsifier are added. This emulsion is a concentrate for producing cutting, drilling, or grinding emulsions that may be diluted as needed at the work site.

EXAMPLE III

The emulsion described in Example I is mixed with 3 parts by weight of an amino soap.

The emulsion containing the amino group is adapted in similar fashion for use as a drilling, grinding, or cutting aid.

EXAMPLE IV

The emulsion from Example I was diluted by a factor of 35 with water and added as a cutting aid to a circular saw with a circular saw blade measuring 5 mm. The emulsion prepared in accordance with the invention worked in a completely satisfactory manner and did not give any evidence of foam formation even at high cutting speeds.

EXAMPLE V

A conventional trade emulsion made of mineral oils and applied as a water-soluble oil demonstrates a much better compatibility with skin when a 2% addition of an emulsion made of wool grease in accordance with the invention is made.

EXAMPLE VI

Completely synthetic drilling emulsions in trade use achieved continuous satisfactory defoaming when a 5% addition of an emulsion in accordance with the invention was made.

EXAMPLE VII

In the case of semi-synthetic trade drilling emulsions that could not be used as drilling emulsions on account of excessive foam formation, a 10% addition of an emulsion in accordance with the invention demonstrated a noticeable improvement in quality and gave satisfactory, relatively long-lasting defoaming. A markedly good adaptation as a drilling, grinding, and cooling emulsion was observed in long-term testing.

Wool grease anhydride is also known as adeps lanae anhydricum.

The features of the invention as delineated in the previous description as well as in the Claims may be essential both individually or in any combination thereof to the realization of the invention in its various embodiments.

I claim:

1. A method of reducing foaming in an aqueous emulsion for drilling, grinding, lubricating, cooling, or wetting while avoiding the introduction of poisonous or allergy-causing ingredients, said aqueous emulsion being made by emulsifying an animal or vegetable wax in a mixture of at least 50% water and 50% ethanolamine, said ethanolamine containing both diethenolamine and triethanolamine, comprising adding to said aqueous emulsion an effective amount of wool grease comprising at least 1% by weight of the total emulsion.

2. The method of claim 1 wherein said wax is a vegetable wax from a plant of the genus Copernicia.

3. The method of claim 1 wherein the aqueous emulsion is made by stirring said mixture at the boiling point of the wax, then cooling the emulsion and adding the wool grease at about 90° C.

4. An emulsion for drilling, grinding, or cooling having a water content of at least 50% by weight and containing animal or vegetable waxes reacted with diethanol and triethanol amines, characterized by its content of from 1 to 10% by weight of emulsified wool grease anhydride.

5. The emulsion of claim 4 containing 0.1 to 0.45% by weight of a conventional trade emulsifier, and wherein said wax in an amount of 10 to 15% is reacted with a mixture of 31 to 34% by weight of diethanolamine and approximately 10 to 12% by weight of triethanolamine.

6. The emulsion of claim 5 wherein the pH value of the emulsion is between 10 and 11.

7. An emulsion for drilling, grinding, or cutting, consisting essentially, by weight, of
  A. The reaction product of:
    1. 10-15 parts of vegetable wax, genus Copernicia,
    2. 31-34 parts of diethanolamine,
    3. 10-12 parts of triethanolamine,
    4. 0.1-0.45 parts of coconut fatty acid diethanol amide emulsifier,
    5. 50 parts of water,
  B. 0.5 to 10 parts of an emulsion of approximately equal parts of:
    1. Wool grease anhydride,
    2. Non-ionic emulsifier with an HLB value of 8-14.

8. The emulsion of claim 7 diluted with up to 35 parts of water per part of emulsion.

* * * * *